United States Patent
Kovacevic

(10) Patent No.: US 9,813,912 B2
(45) Date of Patent: Nov. 7, 2017

(54) SECURE ADAPTIVE DEVICE LOCKING

(71) Applicant: T-Mobile USA, Inc., Bellevue, WA (US)

(72) Inventor: Amela Kovacevic, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/084,853

(22) Filed: Mar. 30, 2016

(65) Prior Publication Data

US 2017/0289804 A1 Oct. 5, 2017

(51) Int. Cl.
*H04W 12/08* (2009.01)
*H04W 4/12* (2009.01)
*H04L 29/06* (2006.01)

(52) U.S. Cl.
CPC ......... *H04W 12/08* (2013.01); *H04L 63/0853* (2013.01); *H04W 4/12* (2013.01)

(58) Field of Classification Search
CPC ..... H04W 12/10; H04W 4/001; H04W 12/08; H04W 8/18; H04W 8/20; H04W 4/12; H04L 63/085
See application file for complete search history.

(56) References Cited

U.S. PATENT DOCUMENTS

| 6,253,073 B1 | 6/2001 | Cooper |
| 8,055,238 B1 | 11/2011 | Gailloux et al. |
| 2001/0030235 A1 | 10/2001 | Hedemann et al. |
| 2007/0129078 A1 | 6/2007 | De Beer |
| 2008/0003980 A1 | 1/2008 | Voss et al. |
| 2008/0005577 A1* | 1/2008 | Rager ........... G06F 21/575 713/183 |
| 2008/0090614 A1 | 4/2008 | Sicher et al. |
| 2008/0107269 A1 | 5/2008 | Gehrmann et al. |
| 2010/0015949 A1 | 1/2010 | Bradley |
| 2010/0095364 A1 | 4/2010 | Norgaard et al. |
| 2010/0299748 A1 | 11/2010 | Johansson et al. |
| 2012/0077496 A1 | 3/2012 | Mathias et al. |

(Continued)

OTHER PUBLICATIONS

Office action for U.S. Appl. 15/084,967, mailed on Jun. 1, 2017, Kovacevic, "Advanced Device Locking Criteria", 12 pages.

(Continued)

*Primary Examiner* — Joseph Dean, Jr.
(74) *Attorney, Agent, or Firm* — Lee & Hayes, PLLC

(57) ABSTRACT

Systems and methods for configuring user equipment (UE) for use with compatible subscriber identity modules (SIMs) is disclosed. The UE can include a UE SIMLock configuration containing one or more UE parameters and a value for each category. A compatible SIM can include a SIM configuration with compatible SIM values. The UE can request a UE SIMLock configuration from one or more telecommunications network devices using secure communications. The UE can receive a UE SIMLock configuration from the telecommunications network device. The UE SIMLock configuration can be applied to the UE modem governing SIMLock engine behavior. The UE SIMLock configuration can be updated dynamically with subsequent messages from the telecommunications network device to reflect changes in the account associated with the UE, such as the fulfillment of a contract or theft of the UE.

18 Claims, 9 Drawing Sheets

(56) References Cited

U.S. PATENT DOCUMENTS

| | | | | |
|---|---|---|---|---|
| 2013/0109352 A1* | 5/2013 | Obaidi | ............... | H04W 12/08 |
| | | | | 455/411 |
| 2013/0303121 A1* | 11/2013 | Zheng | ............... | H04W 8/183 |
| | | | | 455/410 |
| 2015/0126153 A1* | 5/2015 | Spitz | ............... | H04M 1/675 |
| | | | | 455/411 |
| 2016/0037344 A1 | 2/2016 | Kim et al. | | |
| 2016/0277439 A1* | 9/2016 | Rotter | ............... | H04L 63/1441 |

OTHER PUBLICATIONS

Office action for U.S. Appl. No. 15/084,967, mailed on Nov. 21, 2016, Kovacevic, "Advanced Device Locking Criteria", 10 pages.
The PCT Search Report and Written Opinion dated Jun. 22, 2017 for PCT application No. PCT/US2017/023540, 11 pages.
PCT Search Report and Written Opinion dated Jun. 27, 2017 for PCT Application No. PCT/US17/23552, 14 pages.

\* cited by examiner

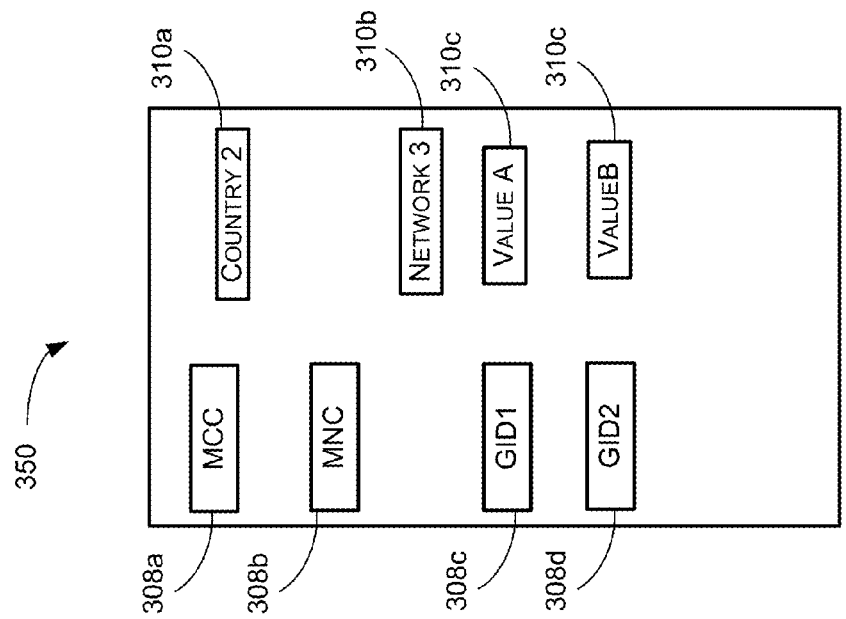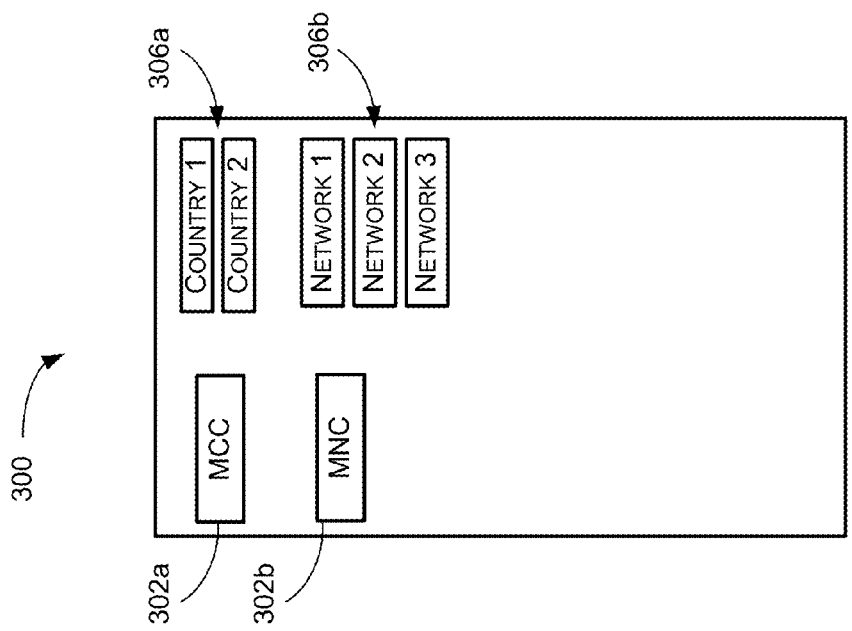
FIG. 4A

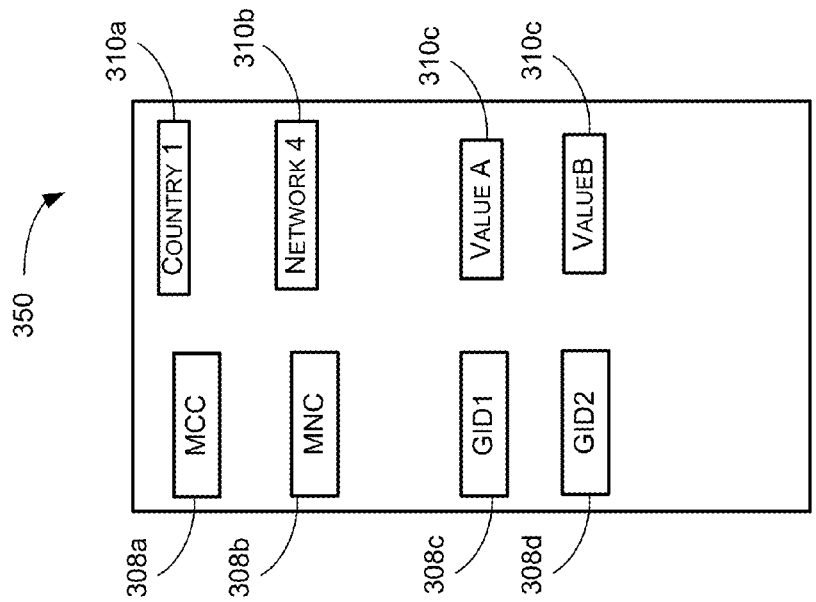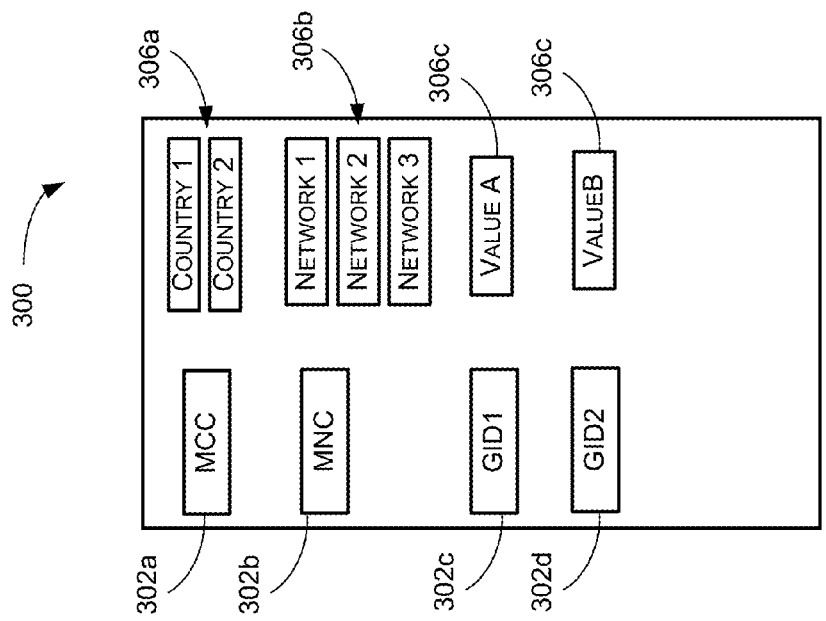
FIG. 4B

SECURE ADAPTIVE DEVICE LOCKING

BACKGROUND

Smart phones and other cellular devices are ubiquitous. People use these devices for both business and personal use. Many cellular devices include both voice call capabilities and data capabilities such as, for example, web browsing and e-mail. These services are generally billed to consumers in plans that may include a predetermined number of minutes, megabytes (MB) or gigabytes (GB) of data, and/or short messaging service (SMS, or text) messages.

Cellular devices can also be billed on a pre-pay or post-pay basis. As the name implies, pre-pay billing requires that the user buy a block of minutes and/or data in advance. When all (or nearly all) of the minutes or data is used, the user must purchase additional minutes and/or data. In some cases, the user may receive a text message or other notification that he is almost out of minutes and/or data. Post-pay customers, on the other hand, are billed for the minutes and/or data used during consecutive billing periods.

Cellular carriers sometimes associated their user equipment (UEs) to their network, or "SIMLock" their devices. This is at least in part because cellular carriers are not solely in the business of selling UEs, but rather tend to sell both UEs and UE related services. Often carriers sell UEs below cost, or subsidized UEs, for example, to attract new customers or retain existing customers. As a result, it is important for carriers to have their UEs locked to their network and/or to be able to apply additional restrictions, as necessary.

Currently these restrictions, or "SIM locking criteria" are hardcoded into the device modem with no ready mechanism to securely update that locking criteria. These criteria can currently only be changed using hardware solutions, such as device re-flashing. This approach presents at least two issues. The first is that the carrier has to decide what device locking rules will be applied at the outset (e.g. restricting a UE to a particular network). These rules are then given to the device manufacturer for hardcoding, for example, and thus must be decided on effectively making the decision permanent. The second issue is that the chosen locking rules cannot now be easily updated without reflashing, for example, which may require returning the UE to the manufacturer, among other things.

As a result, to minimize the number of different devices (e.g., SKUs or variants) that the carrier has to stock, the carrier is forced to choose very generic locking rules. In many cases, the carrier may lock the UE at the country and network level (e.g., MCC/MNC). While this has the advantage of keeping the number of available device variants low—and the costs associated with stocking a supporting each variant—it makes it also provides little opportunity for the carrier to use different, or stricter, locking rules on the UEs once they have been placed in service.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 4A and 4B depict the comparison of various UE SIMLock configurations with various SIM configuration to determine compatibility.

DETAILED DESCRIPTION

Figure 1:
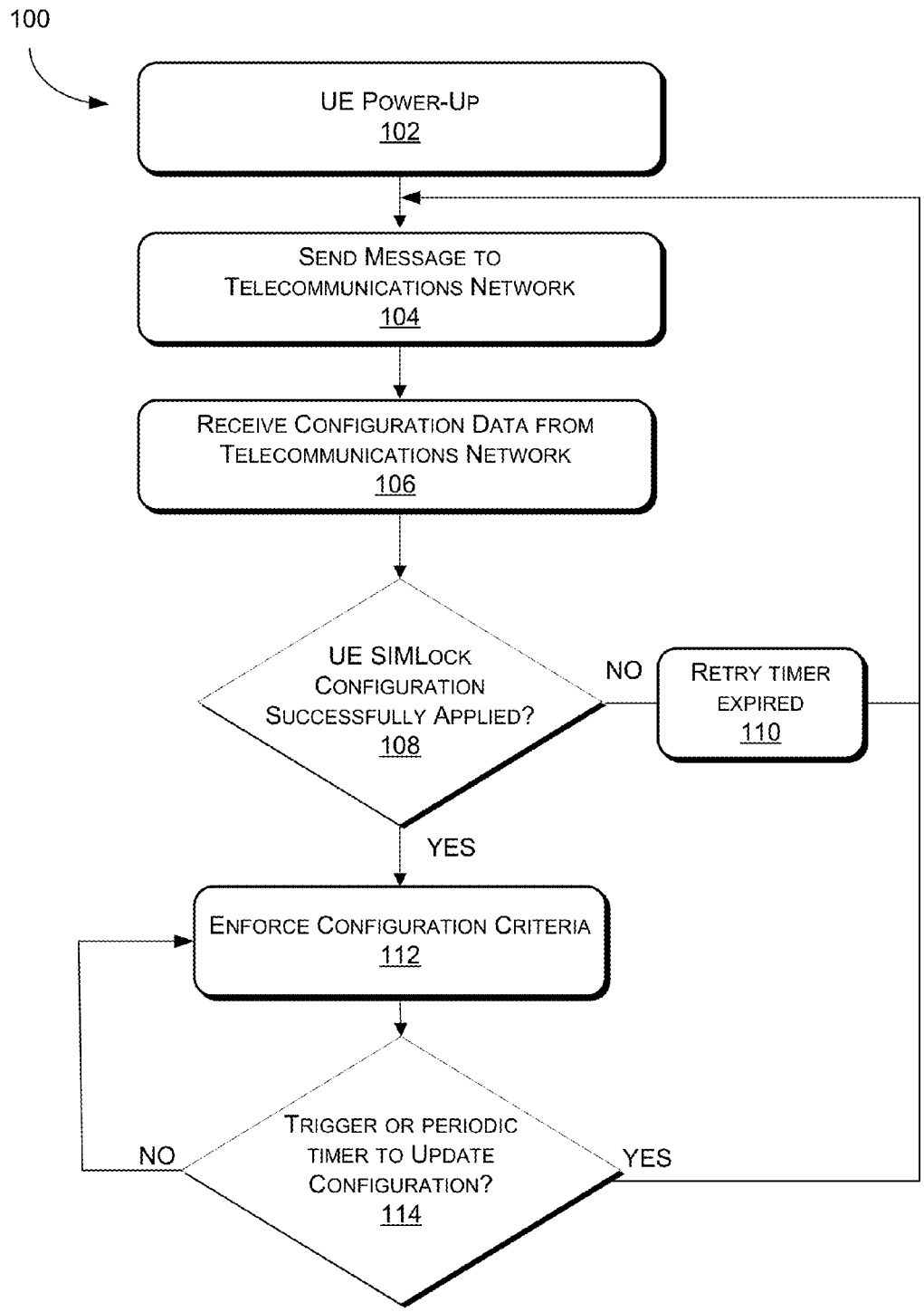
FIG. 1 depicts a flowchart depicting configuring user equipment (UE) at startup using a configuration server.

This disclosure describes, in part, a telecommunication system configured to provide an initial UE SIMLock configuration for a user's equipment (UE) at initial startup and the ability to change the UE SIMLock configuration dynamically during the life of the UE. In some examples, the UE SIMLock configuration of the UE can be programmed with additional parameters over those conventionally provided to provide additional functionality and control. The UE SIMLock configuration can also be updated dynamically to enable parameters to be changed as appropriate.

The system can include a policy engine and a rules engine to provide UE SIMLock configuration parameters to the UE, or "UE parameters." At initial power up, for example, the UE can be programmed to send a secure message to a configuration server requesting an initial UE SIMLock configuration. The configuration server, in turn, can provide a secure message including the UE SIMLock configuration for the UE. If, during the life of the UE this UE SIMLock configuration needs to be changed, the UE can be prompted to request the new UE SIMLock configuration from the configuration server.

The system is described herein with reference to a cellular network and UE. One of skill in the art will recognize, however, that the system is equally applicable to other types of networks such as, for example, Wi-Fi, cable or satellite TV networks, or other networks with billing based on usage. In addition, the term UE used herein can include cellular and smart phones, tablet and laptop computers, games, and other network enabled electronic equipment.

A problem with conventional UE SIMLock configurations is that they are hardcoded by the manufacturer and there in no foreseen mechanism to update it dynamically. In other words, UE SIMLock configuration settings are set by the manufacturer by "flashing," or otherwise hardcoding, the UE SIMLock configuration into the memory (usually non-volatile memory) or hardware of the UE. As a result, to provide phones for different networks, brands, or other parameters, the manufacturer is required to provide multiple SKU numbers—e.g., at least one for each carrier. This is not efficient or practical, as the number of SKUs that would be required is unmanageable.

Because the UE SIMLock configurations are hardcoded and because there is no way to securely update the SIMLock configurations, manufacturers are forced to use different SKUs for each carrier. This, in turn, makes manufacturers unable, or unwilling, to provide UE SIMLock configurations that provide additional controls. In other words, a manufacturer who sells phones to five different carriers may only be able to provide five different SKUs, one for each carrier. This UE SIMLock configuration prevents users from buying a UE from Carrier 1 and then using the UE with Carrier 2, but provides very little else in the way of control. Thus, a carrier that provides multiple brands, for example, or multiple billing types (e.g., pre-paid vs. post-paid) is unable to control these variables.

Thus, a problem with conventional UE SIMLock configurations is that they provide very little information and control and cannot be easily updated. Many UEs provide no control at all (so-called "unlocked" phones), while others are only restricted to use on a particular network ("network locked"). As a result, these phones do not prevent users from switching between carriers (unlocked) or switching plans within the same carrier (network locked only). This can result in substantial costs for a carrier when a user takes a heavily subsidized UE to another provider or switches to a low cost plan, for example, preventing the original carrier from recovering the phone subsidy.

Even if manufacturers could be persuaded to provide additional UE SIMLock configurations parameters to increase control (e.g., to provide multiple SKUs), another problem with conventional UE SIMLock configurations is that they are hardcoded at the factory and cannot be easily updated. In other words, those parameters that are set, such as network restrictions, cannot practically be changed after the UE has left the manufacturer or distributor. This is because, using current technology, any updates to the (hardcoded) UE SIMLock configuration requires that the UE be "reflashed." This generally requires the UE to be sent back to the manufacturer, or at least to a specialized facility. As a result, providers are currently required to either (1) stock a single UE that does not provide much granularity of control or (2) stock multiple UEs, one for each type of account, brand, or customer. Given the number of brands and billing types that exists even within a single carrier, this is not a practical solution. In addition, this solution provides no practical ability to update the UE SIMLock configuration of the UE at the end of a contract, for example, or to add or remove restrictions.

To this end, examples of the present disclosure can comprise systems and methods for providing initial UE SIMLock configurations to UEs. The system can also provide a method for dynamically updating the UE SIMLock configuration during the life of the UE. The system can also enable the UE SIMLock configuration of the UE to be updated dynamically based on changes to the user account or other factors. These updates can be affected without requiring reflashing, or other complex reprogramming or hardcoding.

Overview

As shown in FIG. 1, examples of the present disclosure can comprise a method 100 for configuring a UE. As shown, the method 100 can be used to configure the UE at initial power up. As discussed below with reference to FIG. 8, the method 100 can also be used to update the UE SIMLock configuration during the life of the UE. This may be useful, for example, when a user reaches the end of a contract, for example, or has satisfied initial requirements for a pre-pay plan.

At 102, the UE can be powered on. In some examples, at initial power-up, the UE can be completely unconfigured ("unlocked"), for example, or can be configured to work only on a particular network ("network locked"). Because the UE can be configured dynamically at power up, the manufacturer can provide carrier with only one, or at least a small number, of SKUs. By the same token, the carrier can also stock a single SKU, or at least a small number of SKUs, with the majority of the UE SIMLock configuration performed at startup.

At 104, the UE sends a message to a configuration server requesting its initial UE SIMLock configuration. In some examples, as discussed below, the configuration server can comprise a back-end server provided by the carrier. In other examples, the configuration server can comprise a server maintain by the manufacturer of the UE on behalf of the carrier(s). Regardless, the UE can send a secure message to the configuration server including the necessary encryption and/or other security measures necessary to ensure that the message is authentic and integrity protected As discussed below, in some examples, the UE can include a secure trusted execution environment (TEE). In some examples, the device can use the TEE to compose and send a secure, encrypted message to the configuration server requesting the UE SIMLock configuration. In other examples, the message can be sent via any secure internet connection (e.g., secure Wi-Fi or cellular connection) or via a secure web browser (e.g., "https://..."). In some examples, the message may be composed and encrypted within the TEE, but then sent by an unsecure application (e.g., a normal rich operating system (OS) application), though the application may have no ability to decipher the content of the message. In other words, the application merely passes a message it does not understand along to the configuration server.

In some examples, the message and/or location information for the configuration server can be hardcoded into the UE by the manufacturer or the carrier. In other words, to prevent a UE with a minimal, default UE SIMLock configuration (e.g., network locked only) from being used in an unapproved manner (e.g., with an unapproved SIM) the message and/or configuration server address can be hardcoded into the UEs secure non-volatile memory, for example, such that it is pointed to a particular configuration server. In this manner, upon startup, the UE is immediately configured from a minimally configured default state to a higher level of UE SIMLock configuration.

If the phone has been stolen, for example, the configuration server will either not have a UE SIMLock configuration available for the UE or will simply have the default UE SIMLock configuration. As a result, the UE may maintain the default UE SIMLock configuration, for example, until the theft is discovered. As discussed below, in some examples, the UE may be prompted to update periodically by the configuration server and as a result of an applied SIMLock configuration, the UE may be disabled when the theft is discovered.

At 106, upon confirming the authenticity and integrity of the message from the UE, the configuration server can send a similarly secure message to the UE via the same, or a different channel, including the UE SIMLock configuration data. The UE SIMLock configuration can include, for example, the applicable country codes (MCC), the carrier (MNC) that the UE is compatible with, and other parameters. This prevents users from purchasing a UE from one carrier, but then using it on another carrier. In use cases where an advanced user with UE root access rights hacks and performs unauthorized device SIM unlocks, for example, periodic updates to the SIMLock configurations may revert the hack to the previous SIMLock configuration, and thus revert the unauthorized unlock.

Carriers may also wish to include additional UE SIMLock configuration parameters. Carriers may wish to restrict a particular phone for use with pre-pay accounts associated with particular subscriber identity modules (SIMs) only, for example. Carriers may also wish to restrict by plan type (e.g., pre-pay vs. post-pay), plan levels, etc. Regardless of the actual parameters, the UE SIMLock configuration message can include all of the information needed for the UE to perform initial setup.

At 108, the UE can confirm that the UE SIMLock configuration has successfully been applied. In some examples, the UE SIMLock configuration can be delivered using secure TEE as discussed below in FIGS. 5-6. In this manner, the UE SIMLock configuration can be securely transferred from the server to the device modem and cannot easily be tampered with, or "hacked" (e.g., by injecting with various unlocking codes into the message)

At 110, if the UE SIMLock configuration has not been successfully applied, the UE can resend the UE SIMLock configuration message and essentially restart the process. This can account for UE SIMLock configuration requests not being received at the configuration server, for example, UE SIMLock configurations not being received back at the UE, or the files not being properly applied. This can also account for messages being corrupted in transit (e.g., failing a checksum). In some examples, the UE may wait a predetermined amount of time prior to resending the request. Thus, if the UE SIMLock configuration has not been applied and the retry timer has expired, then the UE can resend the UE SIMLock configuration request message.

At 112, if, on the other hand, the UE SIMLock configuration has been correctly applied, the UE is now configured for operation. If the UE SIMLock configuration includes a network lock, for example, then the UE may only be used with a SIM associated with the correct network. If the UE SIMLock configuration includes a billing type restriction (e.g., pre-pay vs. post-pay), then the UE will only operate with an appropriate SIM associated with pre-pay or post-pay account. If a SIM card is inserted into the UE that is incompatible with the UE SIMLock configuration, the UE may simply turn off or have limited or no functionality.

Because the dynamic updates to the UE SIMLock configuration is provided at start-up, it is not necessary for the carrier or the manufacturer to provide different SKUs for different carriers or UE SIMLock configurations. Indeed, it is possible that the manufacturer could sell a single "unlocked" SKU or SKU with a list of all carrier's MCC/MNCs included in the default SIMLock configuration, for example, or to have one SKU for each carrier, with each SKU pointed to a different configuration server. Thus, while each UE is unconfigured with when leaving the factory, each UE immediately contacts its respective configuration server upon startup and is configured for use.

By the same token, this enables each carrier to stock a single SKU for each UE. This is true regardless of whether the phone will be used, for example, for a pre-paid or post-paid account, which brand the UE is to be associated with, or what features the UE will be able to utilize (e.g., voice, text, internet, etc.). When a UE is sold at a retail location, for example, the proper UE SIMLock configuration for the UE can be assigned to the UE's IMEI in a database that will be queried by the configuration server. Once the UE is powered up, it can be configured as discussed above.

Regardless of whether this is done in the store, for example, or at the customer's convenience, because the UE automatically contacts the configuration server, the result is the same. This avoids the possibility that UEs could be otherwise misappropriated. As mentioned above, if the UE has not been properly attained, the device databases will not have information about that particular UE. In this case, the configuration server can take a pre-programmed action, such as providing default values for the SIMLock configuration, and then decide if the UE will be rendered operable or inoperable in future periodic updates to the SIMLock configuration.

At 114, in some examples, the UE can periodically send another device SIMLock re-configuration message. In some examples, this may be in response to a trigger message sent from the telecommunications network (e.g., to perform an update). This can enable the UE SIMLock configuration to be updated as necessary to apply updates, for example, or to change the UE SIMLock configuration in response to a change in the user's status (e.g., the user's contract expires) or as a mechanism for added security by refreshing the SIMLock configuration per a timer, or other means, that can be provided by the configuration server. Timer values can be increased or decreased depending on configuration server logic in respective to a particular UE. A UE that has no SIMLock configuration on file, for example, may be given a shorter update window to (1) detect a theft, is applicable or (2) apply a correct SIMLock configuration (when available) more quickly.

In some examples, the telecommunications network may send a trigger message in response to a report that the UE is unauthorized. This may be in response to a theft, for example, or a failure of the user to pay the bill. In this case, the telecommunications network can send a trigger message to the UE and then provide the UE with a UE SIMLock configuration that fully or partially disables the UE. The UE may be configured such that it can only call customer service, for example. This can enable the user to correct any billing errors, for example, and can make the UE essentially inoperable for an unauthorized user.

In other examples, the UE may be programmed to periodically resend the UE SIMLock configuration message after a predetermined amount of time. The UE may be hardcoded from the manufacturer, for example, to send a UE SIMLock configuration message every 30 days or UE may have a default timer value and receive an updated timer value from the configuration server In some examples, the UE may request a UE SIMLock configuration, but the configuration server contains only a default UE SIMLock configuration (e.g., network locked only). This may be because the UE has been stolen, but not yet reported, for example, or simply because the sale has not been completed in the seller's system (i.e., it is still processing). In either case, the configuration server may provide the default UE SIMLock configuration to the UE at this time, but reset the "resend window" to a shorter period (e.g., once a week or once a day) until the UE SIMLock configuration is updated. As discussed above, once the UE is reported stolen the configuration server may provide a UE SIMLock configuration that disables the UE. If the sale is completed, on the other hand, the configuration server can provide a new, more detailed (e.g., more restrictive) UE SIMLock configuration.

As discussed below, if there are no changes to the UE SIMLock configuration, the telecommunications network can simply resend the current UE SIMLock configuration to the UE. When applied, the current UE SIMLock configuration will have no net effect on the UE.

Figure 2:
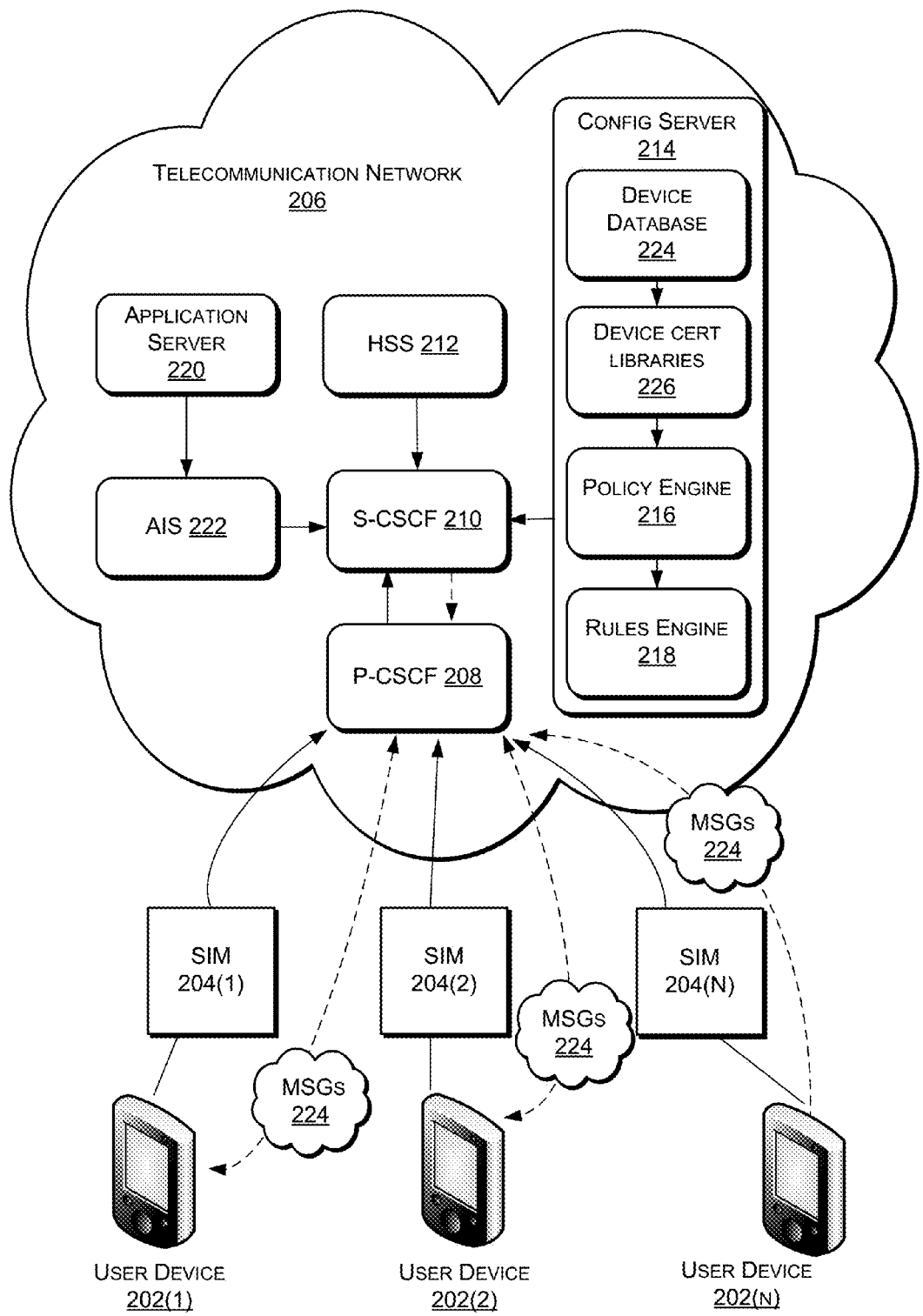
FIG. 2 illustrates an overview and example environment, including a system in which UEs receive UE SIMLock configuration information from a telecommunication network.

FIG. 2 illustrates an overview and example environment, including UEs 202 communicating via a SIM 204 with a telecommunications network 206. The SIM 204 generally includes identifying information for the user and the UE 202, including, among other things, the international mobile subscriber identity (IMSI) number and its related key. This information can be used to identify and authenticate the UE 202 on cellular voice and data networks, such as the telecommunications network 206.

As illustrated, UEs 202, such as UE 202(1), UE 202(2) and UE 202(N), can initiate communications with the telecommunications network 206 via SIMs 204, such as SIM 204(1), SIM 204(2), through SIM 204(N). Calls and data can be route to the UEs 202 via one or more telecommunications devices such as a Proxy Call Session Control Function (P-CSCF) 208 and/or a Serving Call Session Control Function (S-CSCF) 210. The P-CSCF 208 and S-CSCF 210 can receive and routed messages and calls to each of the UEs 202 based on service account information, network identities, contact addresses, and other information. The telecommunication network 206 may also include a home subscriber server (HSS) 212, which may be configured to store and provide the network identities and/or contact addresses associated with a service account associated with the UEs 202.

In various implementations, the UEs 202 may be any sort of computing device or computing devices, such as cellular phones, tablet computers, laptop computers, wearable computers, media players, personal computers (PCs), workstations, or any other sort of device or devices. Different UEs 202 may be different types of UEs 202. UE 202(1) may be a cellular phone (e.g., a smart phone), for example, UE 202(2) may be a tablet computer, and UE 202(n) may be a laptop computer. An example UE 202 is described in detail below with reference to FIG. 4.

Upon powering up, the UE 202 can format and send a "request usage rules" message to the configuration server 214. The UE 202 can send the message to the URL, IP address, or other identifier, hardcoded into the UE 202 by the manufacturer or carrier. The message may be addressed to, for example, https://www.setupserver.com, or other appropriate location.

In some examples, the UE 202 can be pointed to a configuration server 214 maintained by the manufacturer. In this configuration, the manufacturer can maintain a database including an identification for the UE 202 (e.g., a serial number or IMEI) and the carrier to whom the UE 202 was sold. In some examples, the manufacturer can also maintain a database of UE SIMLock configurations provided by the carrier. In other examples, the manufacturer may query a configuration server at the respective carrier for an appropriate UE SIMLock configuration.

Upon locating the UE SIMLock configuration, or receiving the UE SIMLock configuration from the carrier, the manufacturer can then respond to the UE with an appropriately secure message providing the UE SIMLock configuration to the UE 202. In this manner, the security of the connection between the UE 202 and the configuration server 214 is maintained.

This UE SIMLock configuration has the added benefit of enabling the manufacturer to provide a single SKU for all UEs 202, or all UEs 202 of a particular type or model. In other words, all UEs 202 can be hardcoded to contact the (manufacturer's) configuration server 214. The manufacturer's configuration server 214 can then retrieve the UE SIMLock configuration from a database or the appropriate carrier and provide the UE SIMLock configuration to the UE 202. Of course, this requires the manufacturer to maintain a database of at least which carrier each UE 202 is sold to, but this is likely maintained in the normal course of business anyway.

In other examples, the UE 202 can be hardcoded to contact a configuration server 214 maintained by the carrier directly. In this UE SIMLock configuration, the process is much the same, but the UE 202 contacts the carrier's configuration server 214 directly and is provided with the UE SIMLock configuration, without additional communications. In this manner, the carrier can maintain all secure communications within the carrier's network. In some examples, each UE 202 can be hardcoded by the manufacturer for each carrier prior to delivery. In this UE SIMLock configuration, the manufacturer can maintain only a single SKU for each carrier, yet each carrier can further customize each UE 202 as desired via the configuration server 214.

Regardless of who maintains the configuration server, the UE 202 can send an appropriately secure message to the configuration server 214 including at least the UEs 202 IMEI. In some examples, the UE 202 can use the TEE environment to compose a secure, formatted message, or can communicate using other secure means. In some examples, the rules engine 218, which can be a "back-end" entity (or network entity), receives the message. In some examples, the rules engine 218 can be a component of the configuration server 214, as shown. In other examples, the rules engine 218 can comprise a separate network component.

The rules engine 218 can then verify the authenticity of the message (e.g., decrypt it) and verify that the message has been properly received (e.g., perform a checksum). The rules engine 218 may also authenticate the UE 202 using hardware, software, or a combination. This can enable the rules engine 218 to verify that the UE 202 is associated with the carrier, for example, using information provided by the manufacturer, or by querying a manufacturer's server. In some examples, the rules engine 218 can verify the UE 202 by looking up a certificate provided by the UE 202 in a device certificate library 228. After verification, the rules engine 218 can send a message to the policy engine 216 requesting rules and parameter values for that particular IMEI (and thus, that particular UE 202).

In some examples, the policy engine 216 can retrieve information from a device database 226. The device database 226 can include information regarding where and when the UE 202 was sold and under what conditions. The device database 226 may include the name of the retail store that the UE 202 was old in, the price, whether it is prepay or postpay, and any other rate, carrier, or plan restriction. Based at least in part on this information, the policy engine 216 can formulate the correct UE SIMLock configuration 300 for the UE 202. The policy engine 216 can then reply to the rules engine 218 with rule and parameter values that need to be assigned to that particular IMEI.

Upon receiving the rules and parameters from the policy engine 216, the rules engine 218 can compose a response message for the UE 202 including those parameters that should be part of the UEs 202 initial UE SIMLock configuration and an initial value for each parameter. The UE SIMLock configuration can then be used in concert with an appropriately configured SIM 204 to make the phone operational. A more detailed description of this process is described below with reference to FIGS. 5 and 6.

The UE 202 can maintain this UE SIMLock configuration unless, and until, the UE 202 receives a trigger message that causes the UE 202 to repeat the UE SIMLock configuration process and send another UE SIMLock configuration message to the configuration server 214. Many UEs 202 will maintain the same configuration for their entire lifespan. Others may be reconfigured at the end of a contract, for example permanently SIM unlock, or when a certain number of pre-pay minutes have been used.

In further implementations, the telecommunication network 206 may be any sort of telecommunication network or networks associated with a telecommunication service provider. Such a telecommunication network 206 may include a core network and multiple access networks associated with multiple locations. The access networks may include cellular networks—utilizing Long Term Evolution (LTE), Global System for Mobility (GSM), or other cellular technology—and other networks (e.g., Wi-Fi) utilizing unlicensed spectrum. The access networks can also include airborne Wi-Fi and cellular networks such as, for example, Gogo in-flight services.

The core network may support packet-switched or circuit-switched connections and may include a number of network components. Such components may include a home location register (HLR) or HSS 212 for storing user and device information, as well as IMS components, such as the P-CSCF 208 and S-CSCF 210. The components may also include application server(s) 220, such as a telephony application server (TAS) or rich communication service (RCS) server. Further, the telecommunication network 206 may include an account information server (AIS) 222, which may provide network identities, contact addresses, credentials, and other information to the UE 202.

Figure 6:
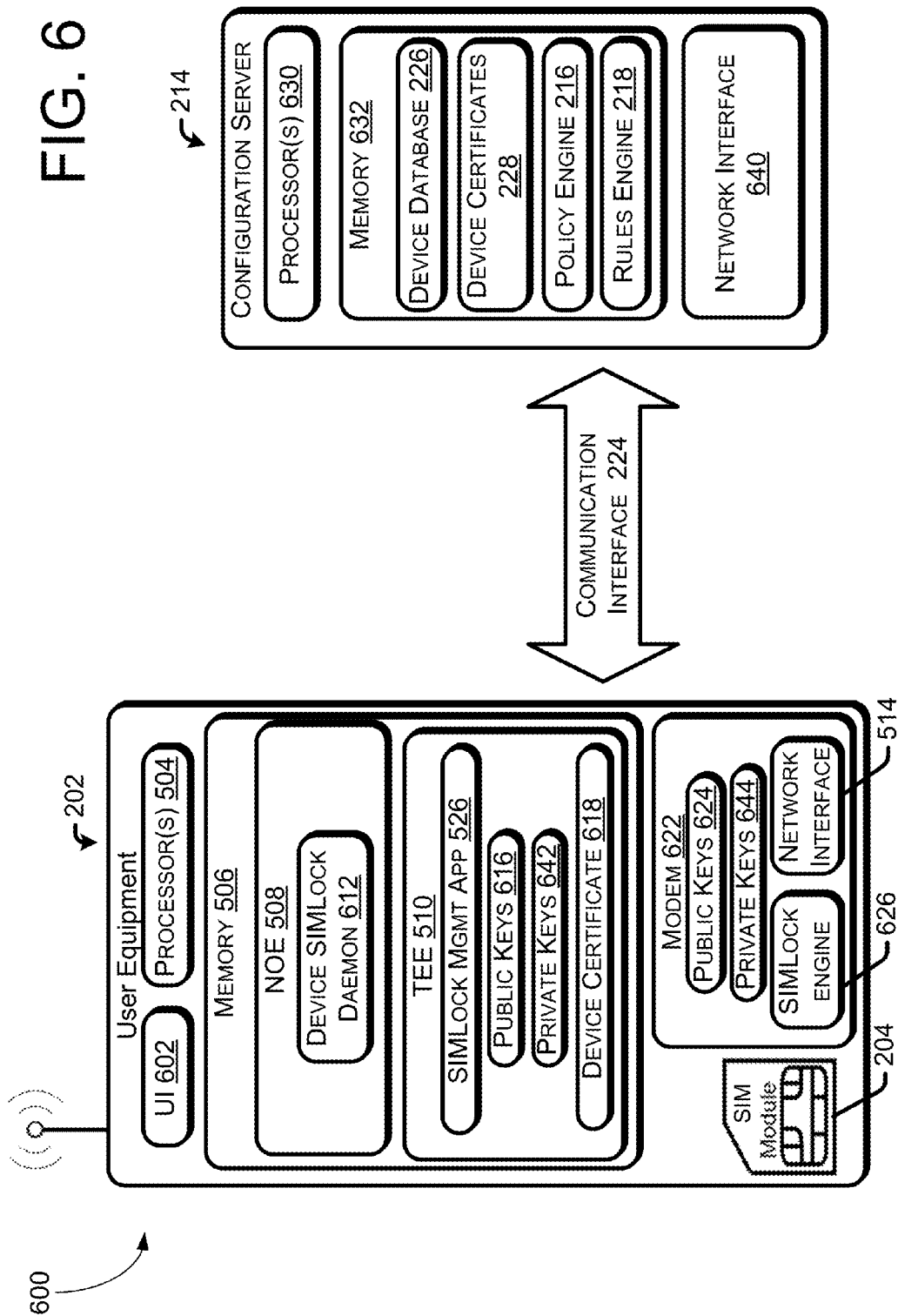
FIG. 6 is an example hardware platform of a user communication device having a trusted execution environment (TEE) component and a normal operating environment (NOE) component.

Any of the telecommunication network devices, such as the P-CSCF 208, S-CSCF 210, application server(s) 220, HSS 212, or account information server 222, may be implemented on one or more computing devices. In addition, the telecommunication network devices, such as the P-CSCF 208 and S-CSCF 210 may be implemented on a single computing device. Such computing devices may each be or include a server or server farm, multiple, distributed server farms, a mainframe, a work station, a PC, a laptop computer, a tablet computer, an embedded system, or any other sort of device or devices. In one implementation, the computing device(s) represent a plurality of computing devices working in communication, such as a cloud-computing network of nodes. An example telecommunication network device 500—which could be used to implement the P-CSCF 208, S-CSCF 210, rules engine 218, policy engine 216, or application server 220—is illustrated in FIG. 6 and is described in detail below with reference to that figure. An example of the AIS 222 is illustrated in FIG. 6 and is described in detail below with reference to that figure.

Figure 3B:
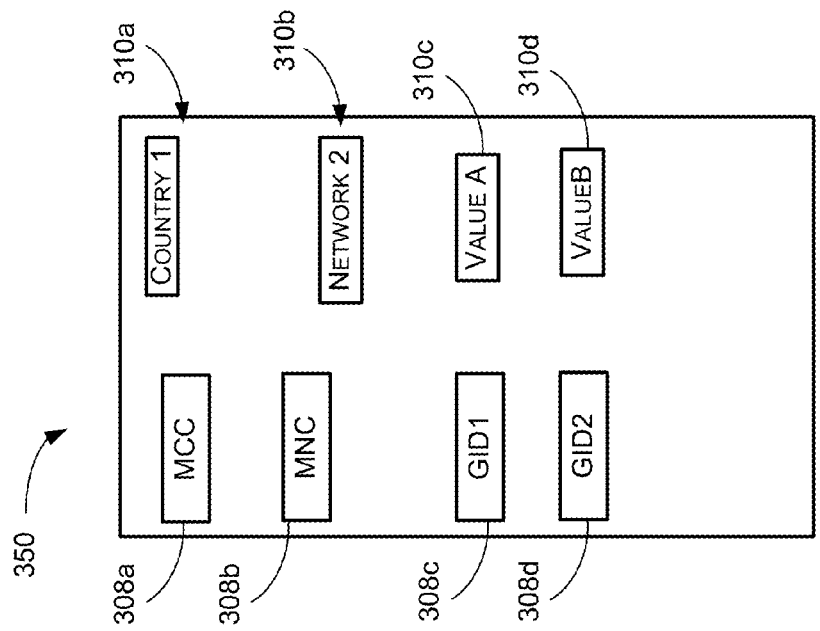
FIGS. 3A and 3B illustrate a UE SIMLock configuration and a SIM configuration, respectively.
Figure 3A:
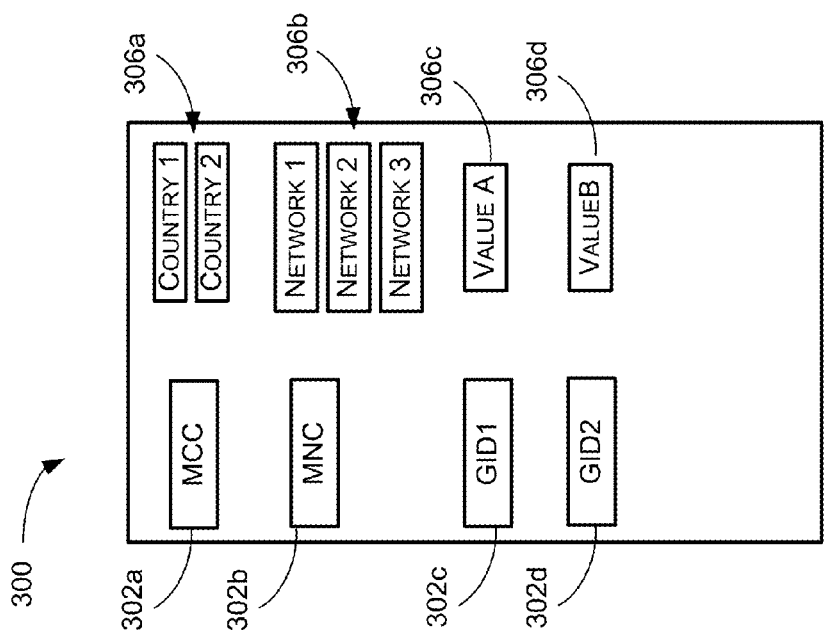

As shown in FIGS. 3A and 3B, the UE 202 can include a UE SIMLock configuration 300 provided by the configuration server 214. The UE SIMLock configuration can include one or more UE parameters 302 and UE values 306 for each parameter. Similarly, the SIM 204 can include a SIM configuration 350 that can include one or more SIM parameters 308 and SIM values 310.

The UE SIMLock configuration data enables the UE 202 to "self-configure." In other words, the UE 202 may be provided by the carrier or manufacturer in the "unlocked" state, i.e., with no restrictions on its use, or with a default "locked" state. Upon receiving the UE SIMLock configuration message from the configuration server 214, however, the UE 202 is provided one or more UE parameters 302 and UE values 306 that provide the UE SIMLock configuration 300. The UE SIMLock configuration 300 need not be an actual database or structure, but is simply meant to denote the settings provided in the UE SIMLock configuration from the configuration server 214.

Thus, the UE SIMLock configuration 300 may contain only a network restriction, for example, restricting the use of the UE 202 to the network, or networks, of a single carrier, for example. As shown, in some examples, the UE SIMLock configuration 300 may contain additional entries to provide additional controls for different brands, different billing types, etc. The actual UE SIMLock configuration of the UE 202 is immaterial; however, the SIM 204 must then contain a complementary SIM configuration 350 that satisfy the rules for the UE SIMLock configuration 300 to operate. The UE 202 can check to ensure a compatible SIM 204 is installed at power up, periodically during use, or at other appropriate times.

The UE SIMLock configuration 300 can include UE parameters 302 and UE values 306. These can include parameters for the country (MCC) 302a, network (MNC) 302b, and other parameters such as GID1 302c and GID2 302D, which can be used for a variety of functions. The UE SIMLock configuration 300 can also include UE values 306 for each of these parameters designating the applicable countries 306a, networks 306b, and other values 306c, 306d. The SIM configuration 350 can comprise similar data for SIM parameters 308 and SIM values 310.

If a UE SIMLock configuration 300 does not match, or is not compatible with, the SIM configuration 350, then the UE 202 can be rendered inoperable for voice calls, data usage, and/or all functions. In some examples, the user may be provided with a message indicating the mismatch and suggesting a possible solution. In some examples, this UE SIMLock configuration can prevent the use of pre-paid phones with post-paid SIMs 204, for example, or users from dropping from a high priced plan to a low priced plan.

As shown, the UE SIMLock configuration 300 can include a number of UE parameters 302 and values 306 provided by the UE SIMLock configuration (FIG. 3A). In this regard, the SIM configuration 350 must include the same, or at least compatible entries, in order for the UE 202 to be operational (FIG. 3B). In some examples, the UE SIMLock configuration 300 and SIM configuration 350 can include codes for standard Third Generation Partnership Project (3GPP) entries. These entries can include, for example, the number mobile country codes (MCC) 302a, 308a, values for the MCCs 306a, 310a, the number of mobile network codes (MNCs) 302b, 308b, and values for the MNCs 306b, 310b. In some examples, additional functionality can be provided by group identity codes (e.g., GID1 302c, 308c and GID2 302d, 308d), with values 306c, 310c, 306d, 310c respectively, for each. In some examples, GID1 302c, 308c and GID2 302d, 308d may be further subdivided to provide additional granularity.

The ability to update the UE SIMLock configuration dynamically enables the manufacturer to provide a single UE 202 to each customer (e.g., carrier, retailer, etc.). In other words, because the UEs 202 default SIMLock configuration can be changed dynamically after manufacturing to set these parameters, providers can stock a single type of UE 202 (e.g., a single SKU). The telecommunications network 206 can then provide the UE parameters 302 and values 306 for each UE 202 upon initial power-up of the UE 202.

In this manner, the selection of parameters 302 to be used, if any, can be determined by each carrier or manufacturer, as desired. Some carriers may provide completely unlocked UEs 202 (priced accordingly) for which no entries 302-308 or values 310-326 are required. Other carriers may provide UEs 202 that are country locked 302a and networked locked 302b, for example. Thus, a user cannot simply change network providers by changing the SIM 204 on a network locked phone. This prevents users from buying an expensive UE 202 at a deep discount from one provider and then switching to another provider.

As shown in FIGS. 4A and 4B, therefore, the UE 202 can check to see if the SIM 204 is compatible in the normal manner. Thus, as shown in FIG. 4A, in some examples, the UE SIMLock configuration 300 may contain UE parameters 302 for the MCC 302a and MNC 302b only. In this UE SIMLock configuration The UE 202 would be considered "network locked," and would require one or more particular networks, but additional UE parameters 302 are not set. As shown, the UE SIMLock configuration has MCC values 306a for Country 1 and Country 2 and MNC values 306b for Network 1, Network 2, and Network 3. Thus, only a SIM 204 with at least one matching MCC value 310a and MNC value 310b is compatible with this UE 202.

In this case, however, because both entries match on the SIM 204, the UE 202 accepts the SIM 204 and is fully functional (in accordance with any limitations provided by the SIM 204). In other words, because both the SIM 204 is configured for Country 2 and Network 3, the necessary UE values 306a, 306b and SIM values 310a, 310b match. In this case, because the UE SIMLock configuration 300 requires only an MCC value 306a and a MNC value 306b, additional parameters (e.g., GID1 308c and GID2 308d) in the SIM configuration 350 can be disregarded. In other words, it is irrelevant whether these entries 308c, 308d contain values or not.

As shown in FIG. 4B, on the other hand, in some examples the UE 202 can require matching entries for MCC 302a, MNC 302b, GID1 302c, and GID 2 302d. In this case, however, the UE 202 is network locked to Network 1, Network 2, and Network 3, but the SIM 204 is configured for Network 4. In this UE SIMLock configuration, the UE 202 can be rendered partially, or fully, inoperable. This UE SIMLock configuration can prevent a user from purchasing a UE 202 from one network provider at a discount and then using the UE 202 on another network, for example.

In response to a determination that the UE 202 and the SIM 204 are incompatible, the UE 202 can take a number of actions. In some cases, the UE 202 can display a message informing the user that the UE 202 and SIM card 204 are incompatible. In other example, the message can further provide information about what the problem is and how it can be corrected. The message may state, for example, "This phone requires a SIM compatible with Network 1 only, please insert a SIM from Network 1." A message related to A GID1 entry 306c may state, for example, "This phone requires a minimum monthly rate plan of $40. Please insert a SIM with a $40 rate plan or higher."

In addition to displaying an error message, the UE 202 can also become fully, or partially, inoperable. The UE 202 may be restricted to making only emergency calls, for example—i.e., the phone can only dial 911. In some examples, the UE 202 may automatically power down after displaying the error message. In still other examples, the UE 202 may only be able to dial customer service (to rectify the problem). In yet other examples, the UE 202 may be able to perform one function (e.g., texting), but not another function (e.g., voice calling) because the UE 202 is compatible with respect to the former, but not the latter.

In some examples, the UE 202 can take one of these actions based on internal software in the UE 202. In other words, if the UE 202 determines that the SIM 204 is incompatible, the UE 202 can disable, power down, etc. In some examples, the severity of the action can vary depending on the type of incompatibility. If, for example, the UE 202 is network-locked and a SIM 204 from a competing network is inserted, the UE 202 may simply power down. If, on the other hand, an incompatible SIM 204 (e.g., pre-paid vs. post-paid) from the same network is inserted, the UE 202 may enable calling to the carrier's customer service only.

In other examples, the UE 202 can send a message via the wireless communication interface 224 to the telecommunications network 206 reporting the incompatibility. In some examples, the message can include the nature of the incompatibility. The telecommunications network 206 can then determine an appropriate action based on the incompatibility and send a return message via the wireless interface 224 with further instructions. In some examples, the action taken by the UE 202 can vary based on the nature of the incompatibility. In some examples, an incompatibility detected by the UE 202 may not actually be an incompatibility and no action is necessary (e.g., the rate plan on the SIM 204 is higher than the rate plan on the UE 202).

Example Devices

Figure 5:
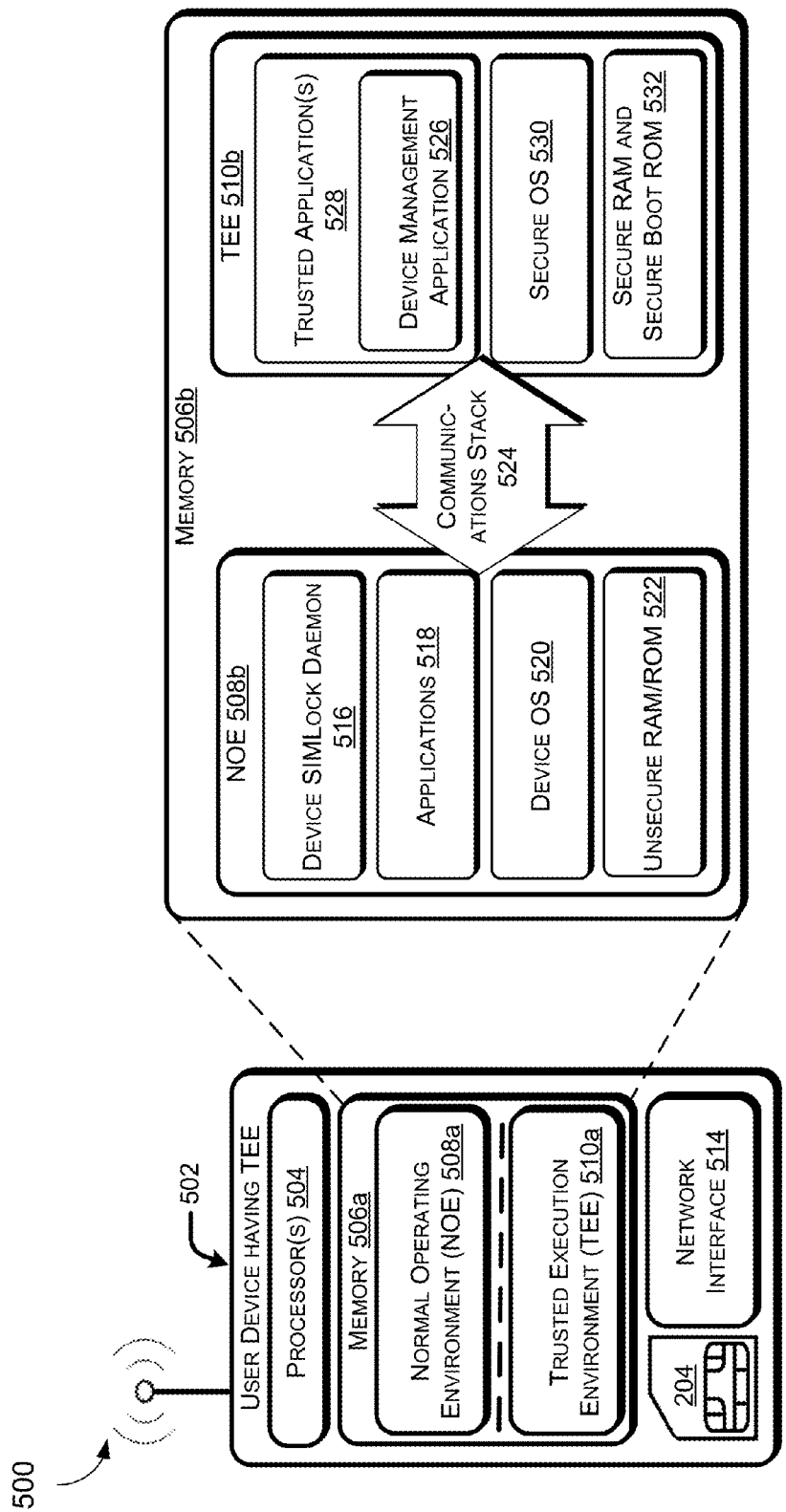
FIG. 5 is an example hardware platform of a user communication device having a trusted execution environment (TEE) partition.

As shown in FIG. 5, the UE 502 can comprise one or more processors 504 and one or more storage devices, or memory 505a. The UE 502 can also comprise a network interface 514 to provide wireless communications between the UE 502 and the telecommunications network 205 via a SIM 204. As discussed below, the UE 502 can also comprise two essentially separate operating environments, the normal operating environment (NOE) 508a and a secure TEE 510a 505a, both of which can be stored in the memory 505b, but may be stored in separate portions of the memory 505b or separate elements of the memory 505b (e.g., separate RAM or ROM).

As them name implies, the NOE 508 can comprise the UEs 502 "normal," unsecure operating environment. As shown in the inset, the NOE 508b can comprise a device SIMLock Daemon 516, one or more applications 518 (e.g., web browsers, e-mail, games, etc.) and the device, or rich, OS 520 and some inter-process communication with the device modem. The NOE 508b can also comprise unsecure storage, such as unsecure RAM and ROM memory 522.

The TEE 510b, on the other hand, can provide a secure environment in which to configure and execute the UE SIMLock configuration 300. The TEE 510b can comprise, for example, one or more trusted applications 528, a secure OS 530, and secure storage, such as secure RAM and ROM 532. As mentioned above, in some examples, the secure memory 532 can be a separate logical partition or a completely separate chip or device from the insecure memory 522.

In some examples, the trusted applications 528 can include a SIMLock management application 526. The SIMLock management application 526 can receive the SIMLock configuration from the configuration server 214. As discussed below, a communications stack 524 can provide secure communications between the NOE 508b (e.g., the device OS 520) and the TEE 510b. Thus, the communications stack 524 can provide communications between the SIMLock daemon 516 in the NOE 508b and the SIMLock application 526 in the TEE 510b. Thus, for example, messages from the configuration server 214 are initially received by the SIMLock daemon in the NOE 508b. The request is then from the device OS 520 to the SIMLock management application 526 in the TEE 510b via the TEE communications stack 524. The SIMLock management application 526 then verifies, authenticates, and/or integrity checks the request. After the SIMLock Application 526 has verified and optionally decrypted the received message (e.g. ensuring the session ID is an expected value) and extracted the UE SIMLock configuration 300 settings, it will send the UE SIMLock configuration 300 to the SIMLock daemon 516 in the rich OS 520 via TEE communications stack 524. The SIMLock daemon 516 can then send the UE SIMLock configuration 300 to the modem, discussed below in more detail with reference to FIG. 6. The modem will (optionally) decrypt and verify the integrity of the received UE SIMLock configuration 300 settings and based on that decide to apply or reject the received UE SIMLock configuration 300.

FIG. 6 focuses on the main components used during a wireless UE SIMLock configuration procedure, where a UE 202 is in communication with a telecommunications device, designated as a configuration server 214. The UE 202 may be representative of any of the UEs 202(1)-202(N) of FIG. 2. In an embodiment, the UE 202 may include, but is not limited to, a user interface 602, one or more processor(s) 504, and a memory 506. As mentioned above, the memory 506 can also include the NOE 508 and the TEE 510.

As shown, the NOE 508 can include the device SIMLock daemon 516. The TEE 510, on the other hand, can include one or more public keys 616, private keys 642, a device certificate 618, and the SIMLock management application 526. The UE 202 can also include a modem 622 including one or more public keys 624, one or more private keys 644, a SIMLock engine 626, and the network interface 514. The device SIMLock daemon 516 can comprise a background application that essentially acts as a liaison between the secure TEE environment 510 and the NOE 508, and between the NOE 508 and the modem 622 using an established inter-process communication between the NOE 508 and the modem 622.

Secure Communication

In this manner, when a trigger message is received from the Configuration server 214 over the wireless interface 224, for example, it is the SIMLock daemon 516—or another rich OS application 518, that will proxy the message to the SIMLock daemon 516—that receives the message. The SIMLock daemon 516 or the proxy application can then verify the message to ensure the message has been properly received (e.g., using a checksum), validate the message to ensure it is from the Configuration server 214 (or other appropriate entity of the telecommunications network 206) and that it is for the UE 202 (e.g., using the IMEI of the UE 202), and/or authenticate the message using the appropriate level of encryption (e.g., private/public key). Once the SIMLock daemon 516 has approved the message, the SIMLock daemon 516 can extract the device IMEI and the start the process of requesting the UE SIMLock configuration 300 by sending a request to format a message via the rich OS 520 to the TEE communications stack 524 to the SIMLock management application 526 inside the TEE 510.

In response to the request, the SIMLock Application 526 can format a message that includes a request for an updated UE SIMLock configuration 300, the device certificate 618, and one or more public keys 616. The device certificate 618 identifies the UE 202 to the configuration server 214. The public key 616 enables the configuration server to decrypt the message from the SIMLock Application 526. In some examples, a private key 642 can be used to prove the authenticity of the message. The SIMLock Application 526 then sends the encrypted message back to the SIMLock daemon 516 via the rich OS to TEE communications stack 524.

The SIMLock daemon 516 can then send the message, with the update request and device certificate 618, to the configuration server 214 via the wireless communication interface 224. Because the message is encrypted, the message can be sent via an application 518 in the NOE 508 (though the application will be unable to understand the message and merely "passes it along"). The application 518 can send the secure message to the configuration server 214 via the network interface 514 and the wireless communication interface 224.

At the configuration server 214, the rules engine 218 then verifies, authenticates, and/or integrity checks the message. The rules engine 218 can verify that the entire message was received, for example, using a checksum, hash verification, or similar. The rules engine 218 can decrypt the message using the appropriate private key associated with the public key 616.

The rules engine 218 can also authenticate the UE 202 to ensure the message is from a UE 202 associated with the carrier, for example. The rules engine 218 can authenticate the UE 202 using hardware, software, or a combination thereof. In some examples, device certificates 228 can be provided to the carrier by the manufacturer regarding authenticating the UE 202. In other examples software libraries or some hardware device, such as a smart card, or other hardware device, can be in communication with the rules engine 218 to authenticate the UE 202. In other examples, the rules engine 218 can contact a manufacturer server for authentication.

The configuration server 214 can then locate the UE 202 in a device database 226. The device database 226 can include information related to how the UE 202 was sold and under what criteria. The device database 226 can include information related to what type of vendor sold the UE 202—e.g., high-end retail, discount retail, government contract, etc. The device database 226 can also include information on whether the UE 202 was sold on a prepaid or postpaid basis, the price, and what type of data plan. The device database 226 can also include what brand within a particular carrier sold the UE 202 and when.

Based on the information found in the device database 226, the policy engine 216 can then formulate a UE SIMLock configuration 300. Thus, if the UE 202 was sold by Carrier 1, Brand 2, for a postpaid account, with a minimum $40/mo. rate plan, the policy engine 216 can provide an updated UE SIMLock configuration 300 including this information. The policy engine 216 can then send the UE SIMLock configuration 300, and any associated information, back to the rules engine 218.

The rules engine 218 can then formulate an appropriately secure message to be sent via the wireless communications interface 224 back to the device SIMLock daemon 516 or a proxy application. Upon receipt, the device SIMLock daemon 516 can pass the message to the SIMLock management application 526 The SIMLock management application 526 can then verify, authenticate, and/or integrity check the message and then send an acknowledgement message back to the device SIMLock daemon 516 that the update message has been received and successfully verified. The device SIMLock daemon 516, in turn, can send the acknowledgment message back to the rules engine 218 to inform the rules engine 218 that the update has been properly received. The rules engine 218 can then send a final message to the device SIMLock daemon 516 that the acknowledgement has been received.

In some examples, an optional registration message can be sent from UE 202 to the configuration server 214. The message can be used to send encrypted symmetric keys from TEE 510*b* and/or the modem 622. After successfully receiving the symmetric keys, the configuration server 214 can send a registration response message to the UE 202. The UE 202 can then use the registration response message as an indicator of successfully transferring the symmetric keys. In some examples, the UE 202 can save that information in non-volatile memory 522, 532 in NOE 508*b* or the TEE 510*b* to avoid unnecessary re-registration before each attempt to send a "request usage rules" message to the configuration server 214.

Secure Application

After receiving and verifying the message, as discussed above, the SIMLock management application 526 can send a message to the device SIMLock daemon 516 in the rich OS 520 via the TEE communications stack 524. The device SIMLock daemon 516, in turn, can send the message to the modem 622 for the modem 622 to apply the updated UE SIMLock configuration 300. In some examples, the SIMLock management application 526 can send the message to the modem 622, along with a message to apply the updated UE SIMLock configuration 300, using the TEE communications stack 524 and the SIMLock daemon 516 in the rich OS 520.

The modem 622 can then decrypt, verify and integrity check the received SIMLock configuration 300 settings from the device SIMLock management application 526. In some examples, the modem 622 can check the IMEI contained in the message to ensure the correct UE SIMLock configuration 300 has been received. In other examples, the modem 622 can also authenticate the message.

The modem 622 can then apply the UE SIMLock configuration 300. If the UE SIMLock configuration 300 is successfully applied, the modem 522 can send a message back to the device SIMLock daemon 516 that the UE SIMLock configuration 300 has been successfully applied. If the modem 622 is unsuccessful in applying the UE SIMLock configuration 300, the modem 622 can send a message to the device SIMLock daemon 516 to restart the process. In other words, the device SIMLock daemon 516 can send another message to the device SIMLock management application 526 to compose an update request message to be sent to the configuration server 214.

Example Processes

Figure 7:
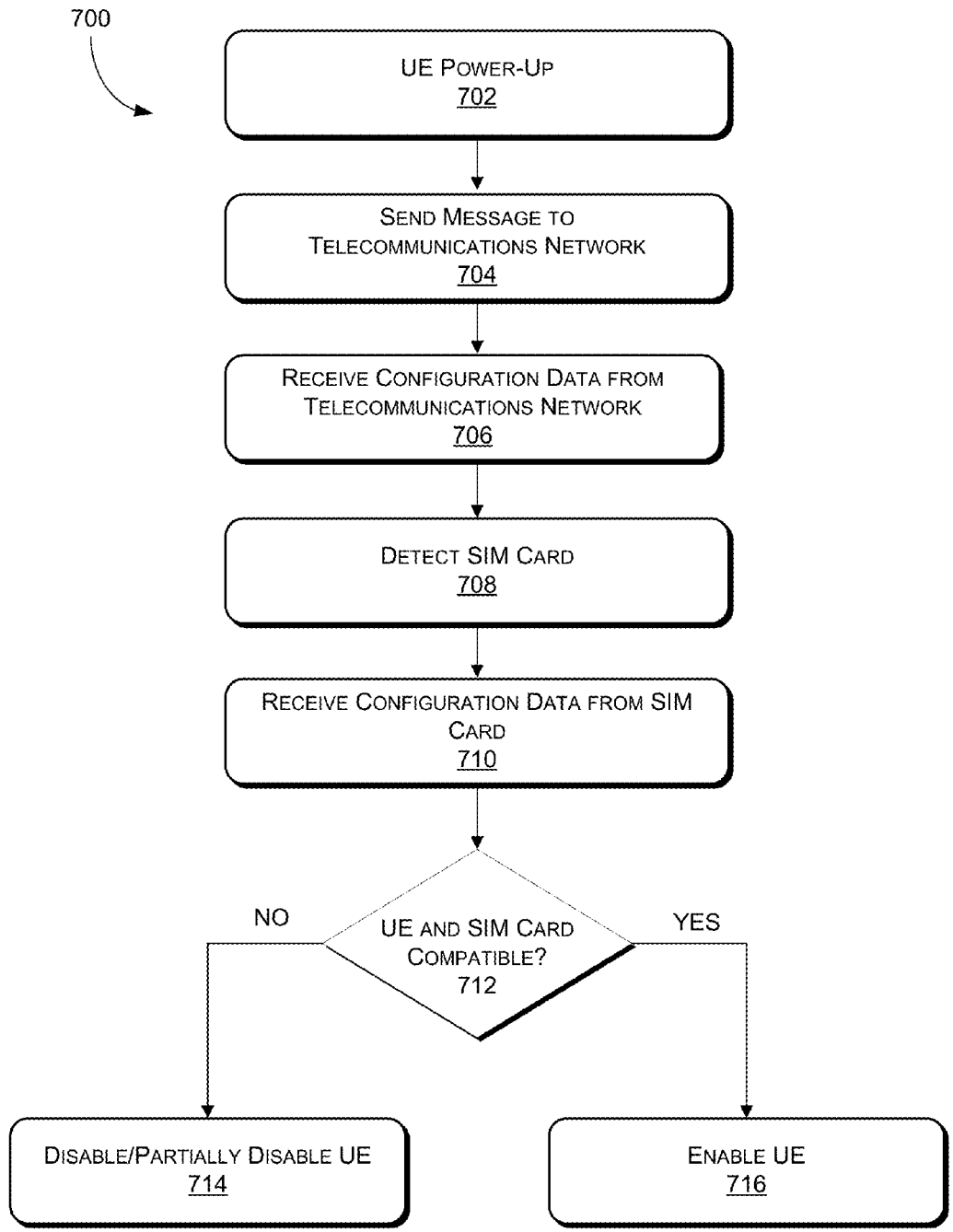
FIG. 7 illustrates an example process for receiving a UE SIMLock configuration for a UE from a telecommunications network and comparing the UE SIMLock configuration to a SIM configuration to determine compatibility.
Figure 8:
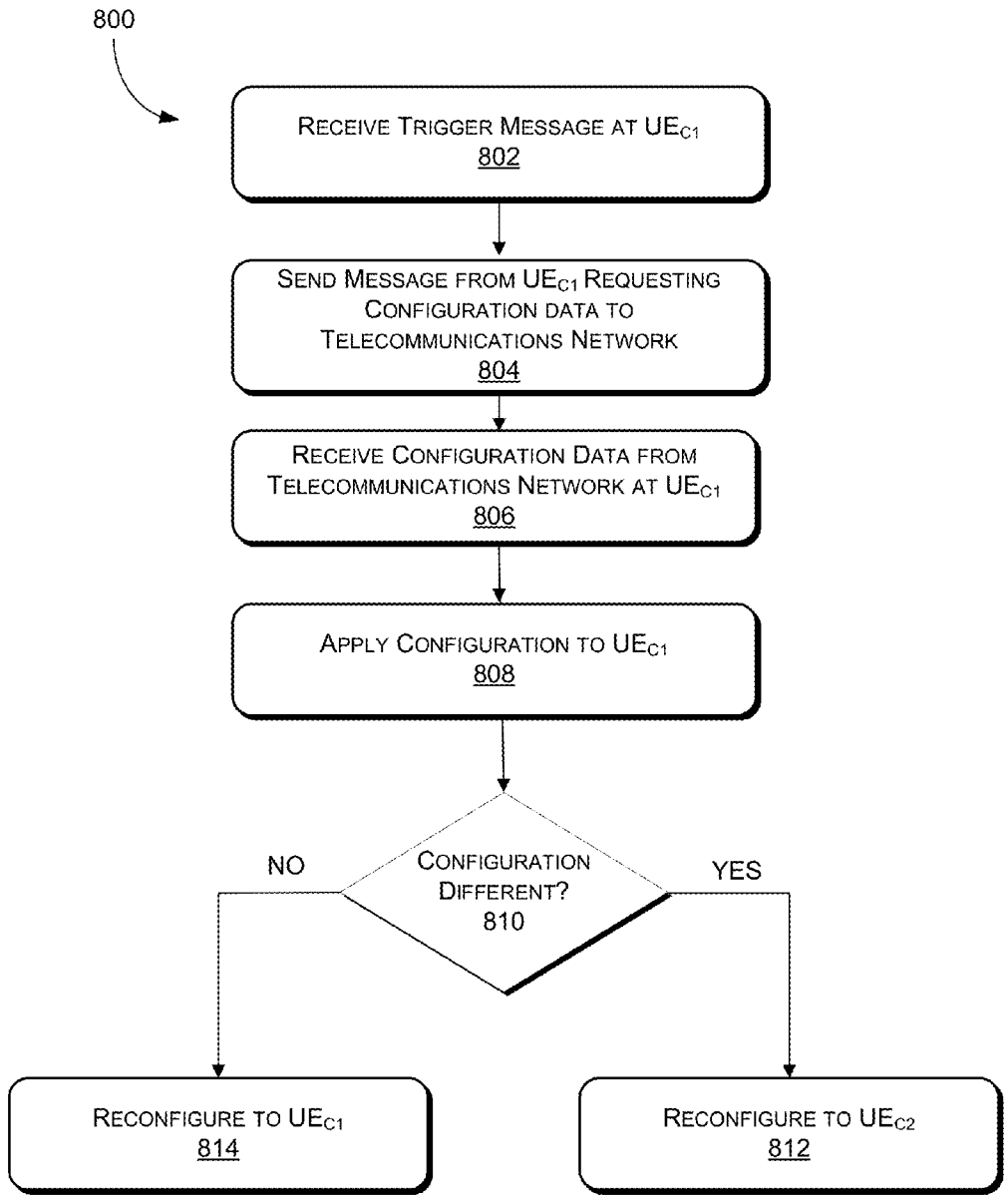
FIG. 8 illustrates an example process for dynamically updating the UE SIMLock configuration of a UE.

FIGS. 7-8 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described should not be construed as a limitation, and any number of the described operations can be combined in any order and/or in parallel to implement the processes.

As shown in FIG. 7, examples of the present disclosure can include a method 700 for configuring a UE 202 and determining if an installed SIM 204 is compatible. At 702, the UE 202 can be powered on. As mentioned above, the UE 202 can check for SIM 204 compatibility at power-up in the normal manner. In some examples, the UE 202 can also check for SIM 204 compatibility periodically during use, for example, or when certain actions are taken (e.g., initiating a voice call).

At 704, the UE 202 can send a secure message to the telecommunications network 206 via a secure channel to receive an initial or updated UE SIMLock configuration, as discussed above. In some examples, the UE 202 can format and send a "request usage rules" message to the telecommunications network 206 including at least the UE's 202 IMEI. The UE 202 can use an appropriately secure format such as, for example, an encrypted message sent via an encrypted channel (e.g., https://), or other similarly secure means. In some examples, the rules engine 218, which can be a "back-end" (or, network) entity, receives the message. The rules engine 218 can then verify the message and send a message to the policy engine 216 requesting the UE SIMLock configuration including rules and parameter values for that particular IMEI (and thus, that particular UE 202). The policy engine 216 can then reply with rule and parameter values that need to be assigned to that particular IMEI.

At 706, the UE 202 can receive the UE SIMLock configuration data from the telecommunications network 206. In some examples, the rules engine 218 can receive the rules and parameters from the policy engine 216 and compose a response message for the UE 202. The message can include the UE parameters 302 that should be part of the UE SIMLock configuration, or SIM-locking criteria, and an initial value, or UE value 306, for each UE parameter 302. The SIM locking criteria can provide values and settings for rules for the UE SIMLock configuration 300 for use with various SIMs 204.

At 708, the UE 202 can detect an inserted SIM 204. This can be done at power-up, for example, to determine if a SIM 204 has been inserted in the SIM holder of the UE 202. In some examples, the SIM 204 may also be detected periodically during use. This can prevent the user from inserting a compatible SIM 204 at power-up to pass the check and then removing the compatible SIM 204 and inserting an incompatible SIM 204 in an effort to circumvent the system.

At 710, the UE 202 can receive the SIM configuration 350 stored on the SIM 204. In some examples, the UE 202 can retrieve all SIM parameters 308 and SIM values 310 stored on the SIM 204. In other examples, the UE 202 can retrieve only those SIM parameters 308 and SIM values 310 present in the UE SIMLock configuration 300. As mentioned above, additional SIM parameters 308 and SIM values 310 may not be required by the UE SIMLock configuration 300.

At 712, the UE 202 or the telecommunications network 206 can determine if the UE 202 and the SIM 204 are compatible. As discussed above, this can be accomplished in the modem 622 or during startup, at reboot, or periodically. As discussed above, this can involve comparing one or more UE parameters 302 and at least one value 306 for each parameter from the UE SIMLock configuration 300 to the SIM value 310 for each respective SIM parameters 308 from the SIM configuration 350. In some examples, this may be done by software or hardware components installed on the UE 202. In other examples, the UE 202 may provide secure messages to the telecommunications network 206 (e.g., the rules engine 218 or other telecommunications network device 600) to complete the comparison on the telecommunications network.

At 714, regardless of where the comparison is performed, if the UE 202 and the SIM 204 are determined to be incompatible, the UE 202 can be partially, or completely, disabled. In some examples, this can include preventing all communication from the UE 202. In other examples, the UE 202 may be able to place emergency calls only (e.g., dial 911). In still other examples, the UE 202 may be enabled for one type of communication, but not another (e.g. enabled for text messages, but disabled for voice calls). In yet other examples, the UE 202 can be powered off to prevent use.

At 716, if the UE 202 and the SIM 204 are determined to be compatible, the UE 202 can be enabled. In some examples, the UE 202 can be fully enabled. In other words, all functions of the UE 202 can be activated (e.g., voice calling, text messaging, instant messaging, internet access, etc.). In other examples, the UE 202 can be enabled based on the SIM 204 or the plan associated with the SIM 204, for example. In other words, some features may not be included in a particular rate plan or for a particular SIM 204 (e.g., pre-pay SIMs 204) and features can be enabled or disabled based on these compatibilities.

Examples of the present disclosure can also comprise a method 800 for dynamically updating the UE SIMLock configuration of a UE 202. At 802, a component of the telecommunications network 206 (e.g., the configuration server 214) can send a trigger message to the UE 202 prompting the UE 202 to request an updated UE SIMLock configuration 300. The trigger message can be sent to a normal OS application 518 or daemon 516 for example, to prompt the trusted device management application 526 to begin the SIMLock configuration process. In essence, the trigger message can return the UE 202 to the "power-up" state discussed above. See, FIG. 1.

Based on the trigger from the telecommunications network, the UE 202—in its current UE SIMLock configuration 1 (denoted as $UE_{C1}$)—can essentially restart the UE SIMLock configuration process described in FIG. 1. At 804, therefore, the $UE_{C1}$ 202 can send a secure message to the telecommunications network 206 requesting a UE SIMLock configuration. This can be performed in substantially the same manner as discussed above for start-up.

At 806, the configuration server 214 can send the current UE SIMLock configuration for $UE_{C1}$ 202. If there are no updates to the UE SIMLock configuration, the UE SIMLock configuration will be the same as the UE SIMLock configuration currently installed on $UE_{C1}$ 202. If there are updates, on the other hand, the UE SIMLock configuration will contain one or more changes to the current UE SIMLock configuration. This can be denoted as Device SIMLock configuration 2 and the updated UE 202 can be denoted as $UE_{C2}$.

At 808, $UE_{C1}$ 202 can apply the UE SIMLock configuration provided by the configuration server. As far as $UE_{C1}$ 202 is concerned, however, it is irrelevant whether the UE SIMLock configuration provided by the configuration server 214 is the same or different, $UE_{C1}$ merely applies the UE SIMLock configuration provided. In other words, $UE_{C1}$ 202 merely follows the same routine as when it is first powered-on and applies the "new" UE SIMLock configuration, whether there are any changes or not.

At 810, the UE SIMLock configuration may be the same or different depending on whether there are any changes in the UE SIMLock configuration. As discussed above, the UE 202 does not care whether there are changes to the UE SIMLock configuration, it simply restarts the process. Indeed, it may be more secure and efficient to simply resend the same UE SIMLock configuration to the UE 202 for reapplication than it is to send a message stating, "there are no changes."

At 812, if there are changes to the UE SIMLock configuration, then applying the UE SIMLock configuration results in a new UE SIMLock configuration, Device SIMLock configuration 2, and the UE 202 can now be denoted as $UE_{C2}$. If necessary, the UE 202 can recheck to ensure that the currently installed SIM 204 is still compatible.

At 814, on the other hand, even if there are no changes to the UE SIMLock configuration, the UE 202 nonetheless applies the UE SIMLock configuration. In this case, however, because there are no changes, the UE 202 remains in Device SIMLock configuration 1, and can still be denoted as $UE_{C1}$. As mentioned above, regardless of whether there is an update, the $UE_{C1}$ 220 can follow the same procedure. As far as $UE_{C1}$ 220 is concerned, it is merely updating the UE SIMLock configuration 300 per the trigger message.

This presents a very secure method for updating the UE SIMLock configuration. Because the UE 202 always initiates the UE SIMLock configuration request and sends device certificates derived unique per device and because the UE 202 is hardcoded to contact the configuration server 214, the security of the process is improved. Even if a hacker were to send a trigger message to the UE 202, for example, the UE 202 nonetheless contacts the configuration server 214. And because the configuration server 214 merely provides the current UE SIMLock configuration, whether it has been updated or not, a message from a hacker has no effect on the UE 202. If there are no changes, the UE 202 simply receives the same UE SIMLock configuration it already has and applies it. The end result is no change to the UE 202. Thus, hacking the UEs 202 UE SIMLock configuration requires the hacker to either intercept the secure communications between the UE 202 and the configuration server 214, or to hack the configuration server 214. Both of these options are very difficult, if not impossible.

The systems and methods disclosed herein enable UEs 202 to be provided with an initial UE SIMLock configuration 300 at startup. This obviates the needs to provide multiple different SKUs for different carriers or options. In addition, the systems and methods described herein enable the UE SIMLock configuration 300 to be updated dynamically by simply repeating the UE SIMLock configuration process. This provides convenience, cost savings, and additional functionality over conventional hard-coded UE SIMLock configurations.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising: sending a first message from a user equipment (UE) to a telecommunications network device requesting a UE SIMLock configuration; receiving a first reply message at the UE from the telecommunications network device, the first reply message including at least the UE SIMLock configuration, the UE SIMLock configuration containing one or more UE parameters for the configuration of the UE; applying the one or more UE parameters to the UE; detecting, with the UE, a subscriber identity module (SIM) inserted into the UE; receiving a SIM configuration from the SIM, the SIM configuration comprising one or more SIM parameters; and comparing values for each of the one or more UE parameters to each respective SIM parameter to determine a compatibility of the SIM and the UE;

wherein, if the UE is incompatible; the UE is partially, or completely, disabled; wherein, if the UE is compatible, the UE is fully enabled; and wherein a network value in the UE SIMLock configuration matches the network value of the SIM configuration.

2. The method of claim 1, wherein sending the first message from the UE to the telecommunications network device comprises sending an encrypted message from a secure trusted execution environment (TEE) on the UE.

3. The method of claim 2, wherein the telecommunications network device comprises a configuration server storing a plurality of UE SIMLock configurations for a plurality of UEs.

4. The method of claim 1, further comprising:
sending a second message from the UE to the telecommunications network device requesting an updated UE SIMLock configuration;
receiving a second reply message at the UE from the telecommunications network device, the second reply message including at least the updated UE SIMLock configuration, the updated UE SIMLock configuration containing one or more updated UE parameters for the UE SIMLock configuration of the UE;
applying the one or more updated UE parameters to the UE; and
comparing values for each of the one or more updated UE parameters to each respective SIM parameter to determine a compatibility of the SIM and the UE.

5. The method of claim 4, further comprising:
receiving a trigger message from the telecommunications network device to send the second message.

6. The method of claim 4, further comprising:
determining that a periodic timer associated with sending the second message has expired.

7. The method of claim 4, further comprising:
sending a value of a periodic timer from the telecommunication network device to the UE;
wherein the periodic timer causes the UE to send at least one of the first message or the second message.

8. The method of claim 1, further comprising:
verifying a validity of the first reply message;
sending an acknowledgement message back to the telecommunications network device;
updating a device database in a telecommunications network database that the UE has been configured; and
sending an acknowledgment message from the telecommunications network device to the UE to apply the UE SIMLock configuration.

9. The method of claim 1, further comprising:
verifying at least one of an authenticity or integrity of the first reply message with a trusted application in a trusted execution environment (TEE) of the UE; and
verifying an integrity and/or decrypting the UE SIMLock configuration in a modem of the UE before applying the one or more UE parameters;
wherein the first reply message is at least one of integrity protected or encrypted.

10. The method of claim 1, further comprising:
verifying that an international mobile station equipment identity (IMEI) in the UE SIMLock configuration is the same as the IMEI of the UE.

11. A method comprising:
receiving a message from a user equipment (UE) at a first telecommunications network device, the message comprising a request for a UE SIMLock configuration;
verifying the message from the UE with the first telecommunications network device;
verifying one or more device certificates from the UE by querying a second telecommunications network device that contains at least one of libraries, data, or algorithms for verifying device certificates; and
sending the UE SIMLock configuration from the first telecommunications network device to the UE;
sending the message from the first telecommunications network device to a second telecommunications network device after verifying the message, the second telecommunications network device storing the UE SIMLock configuration; and sending the UE SIMLock configuration from the second telecommunications network device to the first telecommunications network device.

12. The method of claim 11, wherein receiving the message from the UE at a first telecommunications network device comprises receiving the message at a rules engine of a configuration server.

13. The method of claim 11, wherein sending the message from the first telecommunications network device to the second telecommunications network device comprises sending the message from a rules engine to a policy engine of a configuration server.

14. The method of claim 11, wherein the UE SIMLock configuration comprises one or more UE parameters associated with usage restrictions for the UE.

15. The method of claim 14, wherein the UE SIMLock configuration further comprises a value for each of the one or more UE parameters; and wherein the value further modifies a usage restriction for the UE.

16. The method of claim 15, wherein a first UE parameter of the one or more UE parameters comprises a network restriction; and
a network value associated with a carrier restriction for the UE.

17. The method of claim 11, further comprising:
sending a trigger message from the first telecommunications network device to the UE to cause the UE to send a UE SIMLock configuration update request message to the first telecommunications network device;
receiving the UE SIMLock configuration update request message from the UE at the first telecommunications network device; and
sending an updated UE SIMLock configuration from the first telecommunications network device to the UE.

18. The method of claim 11, further comprising:
determining that the UE sending the message is not authorized;
wherein the UE SIMLock configuration partially or completely disables the UE.

* * * * *